United States Patent
Kim et al.

(10) Patent No.: US 9,045,686 B2
(45) Date of Patent: Jun. 2, 2015

(54) LIQUID CRYSTAL COMPOSITION

(71) Applicant: LG CHEM, LTD., Seoul (KR)

(72) Inventors: Sin Young Kim, Daejeon (KR); Moon Soo Park, Daejeon (KR); Dae Hee Lee, Daejeon (KR); Da Mi Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/134,916

(22) Filed: Dec. 19, 2013

(65) Prior Publication Data

US 2014/0120272 A1 May 1, 2014

Related U.S. Application Data

(63) Continuation of application No. PCT/KR2013/000895, filed on Feb. 4, 2013.

(30) Foreign Application Priority Data

Feb. 2, 2012 (KR) .................. 10-2012-0010706
Feb. 4, 2013 (KR) .................. 10-2013-0012595

(51) Int. Cl.
*C09K 19/56* (2006.01)
*C09K 19/52* (2006.01)
*C09K 19/38* (2006.01)
*C08J 5/18* (2006.01)
*G02B 5/00* (2006.01)
*C09K 19/04* (2006.01)
*C09K 19/20* (2006.01)

(52) U.S. Cl.
CPC ............. *C09K 19/56* (2013.01); *C09K 2219/03* (2013.01); *Y10T 428/1005* (2015.01); *C09K 2019/0448* (2013.01); *C09K 2019/2078* (2013.01); *C08J 5/18* (2013.01); *G02B 5/00* (2013.01)

(58) Field of Classification Search
CPC ............... C09K 19/0448; C09K 19/56; C09K 2219/03; Y10T 428/1005
USPC ............... 349/123; 252/299.01, 299.4, 299.5; 428/1.2

See application file for complete search history.

(56) References Cited

U.S. PATENT DOCUMENTS

| | | | |
|---|---|---|---|
| 2008/0179565 A1 | 7/2008 | Hsieh et al. | |
| 2008/0284948 A1* | 11/2008 | Koishi et al. | 349/96 |
| 2010/0283951 A1* | 11/2010 | Lee et al. | 349/124 |
| 2011/0230606 A1* | 9/2011 | Seo et al. | 524/114 |

(Continued)

FOREIGN PATENT DOCUMENTS

| | | |
|---|---|---|
| JP | 2007304215 A | 11/2007 |
| KR | 1020030017381 A | 3/2003 |

(Continued)

*Primary Examiner* — Shean C Wu
(74) *Attorney, Agent, or Firm* — McKenna Long & Aldridge, LLP

(57) ABSTRACT

The present application relates to a liquid crystal composition, a liquid crystal cell, a liquid crystal film, and methods of preparing the same. As an exemplary liquid crystal composition, according to the present application can provide a liquid crystal layer aligned without a special alignment layer. According to the liquid crystal composition, all of the liquid crystal cell, in which the liquid crystal layer is maintained in a non-polymerized state, and the liquid crystal film prepared by polymerizing the liquid crystal layer can be provided.

11 Claims, 4 Drawing Sheets

(56) References Cited

U.S. PATENT DOCUMENTS

| | | | |
|---|---|---|---|
| 2012/0013834 A1* | 1/2012 | Ryu et al. | 349/123 |
| 2012/0015116 A1* | 1/2012 | Choi et al. | 428/1.2 |
| 2013/0227830 A1* | 9/2013 | Su et al. | 29/458 |

FOREIGN PATENT DOCUMENTS

| | | |
|---|---|---|
| KR | 1020090079842 A | 7/2009 |
| KR | 1020120008425 A | 1/2012 |
| KR | 1020120008443 A | 1/2012 |
| TW | 200831542 A | 8/2008 |
| TW | 201204761 A | 2/2012 |
| WO | 2006064834 A1 | 6/2006 |

* cited by examiner

LIQUID CRYSTAL COMPOSITION

This application is a Continuation Bypass Application of International Patent Application No. PCT/KR2013/000895, filed Feb. 4, 2013, which claims priority to and the benefit of Korean Patent Application Nos. 10-2012-0010706 filed on Feb. 2, 2012 and 10-2013-0012595, filed Feb. 4, 2013, in the Korean Intellectual Property Office, all of which are hereby incorporated by reference in their entirety.

TECHNICAL FIELD

The present application relates to a liquid crystal composition, a liquid crystal film and method of preparing the same.

BACKGROUND ART

A liquid crystal compound means an organic compound having optical anisotropy and crystalline property in the molecular orientation. The liquid crystal compound is filled in a panel of a display device, and the like and rearranged by supply of voltage, whereby it may be used to control quantity of light penetrating through the panel. Also, the liquid crystal compound is polymerized in an aligned state and thereby may be used for an optical film, and the like such as a retardation film. In such a case, an alignment layer may be used in order to impart an order to the liquid crystal compound and in order for the liquid crystal compound to response regularly.

Generally, an alignment layer is formed by applying an aligning agent such as polyimide or polyvinyl alcohol on a substrate, and orientation is imparted by rubbing the alignment layer in a predetermined direction. Later, a polymerized liquid crystal compound is applied and aligned thereon to prepare a liquid crystal layer. However, since the rubbed alignment layer has insufficient adhesive strength to the liquid crystal layer, a problem in which the liquid crystal layer is peeled or contracted in a severe environment, such as a high-temperature or high-humidity environment, may occur. Further, a rubbing method may have problems in which static electricity or scratch is easily generated due to friction during a rubbing process, and fine dust can be generated problem from a rubbing fabric, and the like.

A non-contacting alignment method is known for solving the problems of rubbing method, and Patent document 1 discloses a light alignment method using light irradiation. However, such a method is cumbersome because a process for forming a special alignment layer should be performed.
[Patent document 1] KR Patent No. 10-2012-0008425

DISCLOSURE

Technical Problem

The present application is directed to provide a liquid crystal composition, a liquid crystal film and method of preparing the same.

Technical Solution

An embodiment of the present application provides a liquid crystal composition including a photo-alignment material including a halogen element and a liquid crystal compound.

When the liquid crystal composition is used, a liquid crystal layer including a liquid crystal compound aligned without a special alignment layer may be formed. Further, the liquid crystal composition may form a liquid crystal layer and an alignment layer that is phase-separated from the liquid crystal layer in a one process at the same time. Accordingly, even though the alignment layer and the liquid crystal layer are formed from one type of composition, components of the alignment layer and the liquid crystal layer may be prevented from being mixed in one layer and affecting mutual functions.

In the present specification, the term ⌈phase-separation⌋ and ⌈layer-separation separation⌋ are substantially used as an identical meaning and may mean that a layer formed by substantially one component may be located or disposed on a layer formed by substantially other components. In addition, the term ⌈layer layer formed by substantially one component component⌋ may mean that only one component presents in one layer or one component is richer than other components.

A liquid crystal composition may include a photo-alignment material including a halogen element. In the present specification, the term ⌈photo-alignment material⌋ means a compound that is orientationally ordered in a predetermined direction through light irradiation, and the like, and is capable of aligning adjacent liquid crystals through an interaction, such as an anisotropic interaction in such an orientationally ordered state.

A photo-alignment material may be a unimolecular compound, monomer compound, an oligomer compound, or a polymer compound.

The photo-alignment material including the halogen element may be a compound including a photosensitive moiety and a halogen element. Examples of the photo-alignment material may include a compound that is orientationally ordered by a photo-crosslinking or photopolymerization, such as [2+2] cycloaddition, [4+4] cycloaddition, or photo-dimerization. In addition, examples of the compound that is orientationally ordered by the photo-crosslinking or photopolymerization may include a cinnamate compound, a coumarin compound, a cinnamamide compound, a tetrahydrophthalimide compound, a maleimide compound, a benzophenone compound, a diphenylacetylene compound, a compound having a chalconyl moiety as a photosensitive moiety (hereinafter, referred to as a chalconyl compound), a compound having an anthracenyl moiety (hereinafter, referred to as an anthracenyl compound), and the like.

As an example, a photo-alignment material including a halogen element may be a compound including a unit represented by the following Chemical Formula 1:

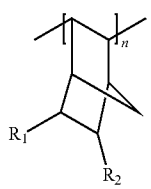

[Chemical Formula 1]

wherein n represents a number of 50 to 5,000 in the above Chemical Formula 1 and $R_1$ and $R_2$ each independently represents hydrogen, halogen, an alkyl group, or a residue represented by the following Chemical Formula 2, wherein at least one of the $R_1$ and $R_2$ represents a moiety represented by the following Chemical Formula 2,

[Chemical Formula 2]

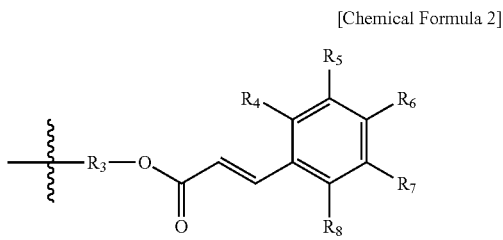

wherein, $R_3$ represents an alkylene group or an alkylidene group in the above Chemical Formula 2 and $R_4$ to $R_8$ each independently represents hydrogen, halogen, an alkyl group, an alkoxy group, or an allyloxy group, and at least one of the unit represented by the above Chemical Formula 1 and moiety represented by the Chemical Formula 2 includes a halogen element as a substituent.

In the present specification, the term "halogen" may include fluorine, chlorine, bromine, iodine, and the like, unless particularly indicated otherwise.

In addition, examples of the term "alkyl group" may include, unless particularly indicated otherwise, an alkyl group having 1 to 20 carbon atoms, 1 to 16 carbon atoms, 1 to 12 carbon atoms, 1 to 8 carbon atoms, 1 to 4 carbon atoms, 4 to 10 carbon atoms, or 6 to 9 carbon atoms. Such an alkyl group may be a linear chain, branched-chain or ring-type. Examples of the "alkyl group" may include a methyl group, an ethyl group, a propyl group, an isopropyl group, a butyl group, an isobutyl group, a tert-butyl group, a pentyl group, a neopentyl group, a cyclohexyl group, a hexyl group, an octyl group, a nonyl group, a decyl group, and the like. The alkyl group may arbitrarily be substituted by at least one substituent.

Also, examples of the term "alkoxy group" may include, unless particularly indicated otherwise, an alkoxy group having 1 to 20 carbon atoms, 1 to 16 carbon atoms, 1 to 12 carbon atoms, 1 to 8 carbon atoms, 1 to 4 carbon atoms, 4 to 10 carbon atoms, or 6 to 9 carbon atoms. Such an alkoxy group may be a linear chain, branched-chain or ring-type. Examples of the alkoxy group may include a methoxy group, an ethoxy group, a propoxy group, an isopropoxy group, a butoxy group, an isobutoxy group, a tert-butoxy group, and the like. In addition, the alkoxy group may arbitrarily be substituted by at least one substituent.

In addition, examples of the term "alkylene group" or "alkylidene group" may include, unless particularly indicated otherwise, an alkylene group or alkylidene group having 1 to 20 carbon atoms, 1 to 16 carbon atoms, 1 to 12 carbon atoms, 1 to 8 carbon atoms, 1 to 4 carbon atoms, 4 to 10 carbon atoms, or 6 to 9 carbon atoms. Such an alkylene group or alkylidene group may be a linear chain, branched-chain or ring-type. The alkylene group or alkylidene group may arbitrarily be substituted by at least one substituent.

A mark

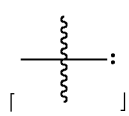

in the above Chemical Formula 2 may mean that the site thereof is linked to a mother compound. For example, a mark

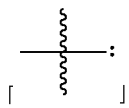

at the left of $R_3$ in the above Chemical Formula 2 may mean that the $R_3$ is directly linked to norbornane of Chemical Formula 1.

A halogen element of the compound having a unit represented by the above Chemical Formula 1 may be directly and covalently bonded to at least any one site of $R_1$, $R_2$, and $R_4$ to $R_8$; or may be included in a state in which a halogen element is substituted at a divalent moiety of $R_3$ or substituents of $R_1$, $R_2$, and $R_4$ to $R_8$.

As an example, at least one of $R_4$ to $R_8$ in Chemical Formula 2 may be a halogen element, an alkyl group substituted by a halogen element or an alkoxy group substituted by a halogen element.

The term "alkyl group substituted by a halogen element" may mean an alkyl group, in which at least one of hydrogen of the aforementioned alkyl group is substituted by a halogen element, unless particularly indicated otherwise. For example, the alkyl group, in which one of hydrogen of a methyl group is substituted by a halogen element, may be a fluoromethyl group, a chloromethyl group, a bromomethyl group, or an iodomethyl group. The alkyl group having a substituted halogen element may arbitrarily be substituted by at least one substituent besides a halogen element.

Also, the term "alkoxy group substituted by a halogen element" may mean an alkoxy group, in which at least one of hydrogen of the aforementioned alkoxy group is substituted by a halogen element, unless particularly indicated otherwise. For example, the alkoxy group, in which one hydrogen of a methoxy group is substituted by a halogen element, may be a fluoromethoxy group, a chloromethoxy group, a bromomethoxy group, or an iodomethoxy group. The alkoxy group substituted by a halogen element may arbitrarily be substituted by at least one substituent besides a halogen element.

As an example, n in the above Chemical Formula 1 may represent a number of 50 to 3,000 or 50 to 1,500. Also, $R_1$ and $R_2$ in Chemical Formula 1 each independently represents hydrogen, halogen, an alkyl group, or a moiety represented by the above Chemical Formula 2, wherein at least one of the $R_1$ and $R_2$ may be a moiety represented by the above Chemical Formula 2. In addition, as another example, $R_1$ and $R_2$ each independently represents hydrogen, an alkyl group having 1 to 6 carbon atoms or a moiety represented by the above Chemical Formula 2, wherein at least one of the $R_1$ and $R_2$ may be a moiety represented by the above Chemical Formula 2.

As an example, $R_3$ in the above Chemical Formula 2 may be an alkylene group or alkylidene group having 1 to 4 carbon atoms. In addition, $R_4$ to $R_8$ each independently represents hydrogen, halogen, or an alkyl group, but at least one of the $R_4$ to $R_8$ may be halogen.

A compound having a unit represented by the above Chemical Formula 1 may be homopolymer or copolymer. When the compound having the unit represented by the above Chemical Formula 1 is copolymer, a repeating unit that is included in the photo-alignment material besides the unit represented by the above Chemical Formula 1 may include all of the repeating units formed from the monomers that are known in the prior art as long as the repeating units do not interrupt orientation of the photo-alignment material.

In addition, an end of the compound having the unit represented by Chemical Formula 1 may be formed as an end that is known in the prior art. As an example, the end of the above compound may be formed to have an alkyl group or alkoxy group.

When a photo-alignment material is a polymerized compound, the material may have a weight average molecular weight of about 10,000 g/mol to 500,000 g/mol, for example, but the present invention is not limited thereto. The term "weight average molecular weight" may mean a conversion value to a standard polystyrene measured by a gel permeation chromatograph (GPC), and unless particularly indicated otherwise, a molecular weight may mean a weight average molecular weight.

A liquid crystal composition may include a liquid crystal compound. In the present specification, the term 「 liquid crystal 」 may mean a compound having a site capable of exhibiting liquid crystalline properties, for example, a mesogen frame, and the like.

The liquid crystal composition may provide, for example, a liquid crystal layer including an orientated liquid crystal compound in a non-polymerized state and an orientated liquid crystal compound in a polymerized state. Here, including the liquid crystal compound in a non-polymeric state may mean that the liquid crystal compound is included such that the liquid crystal compound may be rearranged by an external stimulus, for example, supply of voltage, and the like. Also, here, including the liquid crystal compound in a polymerized state may mean that the liquid crystal compound is included such that the orientation thereof is not modified by an external stimulus, and the like. In other words, since the liquid crystal composition may provide the liquid crystal layers in a non-polymerized and a polymerized state, a type of the liquid crystal compound included in the liquid crystal composition may properly be selected in view of use of the liquid crystal composition.

As an example, the liquid crystal composition used in the liquid crystal layer in a non-polymerized state may include a non-polymerized liquid crystal compound or polymerized liquid crystal compound. In addition, as another example, the liquid crystal composition used in the liquid crystal layer in a polymerized state may include a polymerized liquid crystal compound. In the present specification, the term 「non-polymerized liquid crystal compound」 may mean a liquid crystal compound without a polymerized functional group, and the term "polymerized liquid crystal compound" may mean a liquid crystal compound including at least one polymeric functional group.

As an example, examples of a polymerized functional group of a polymerized liquid crystal compound may include, for example, a functional group including an ethylenically unsaturated double bond, which is capable of being polymerized or cross-linked by a free radical reaction. Here, examples of the functional group of the polymerized liquid crystal compound may include, for example, an alkenyl group, an epoxy group, a cyano group, a carboxyl group, an acryloyl group, a methacryloyl group, an acryloyloxy group, a methacryloyloxy group, and the like. As an example, the polymerized liquid crystal compound may include the type of one or the type of two or more functional groups of a vinyl group, an allyl group, an acryloyl group, a methacryloyl group, an acryloyloxy group, and a methacryloyloxy group. Also, the polymerized liquid crystal compound may include, for example, one, two, three, or four or more above functional groups. As an example, the polymerized liquid crystal compound may include one, two, or three above functional groups.

As an example, the non-polymerized liquid crystal compound or polymerized liquid crystal compound may be a compound represented by the following Chemical Formula 3:

[Chemical Formula 3]

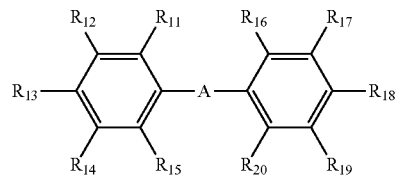

wherein A represents a single bond, —COO—, or —OCO— in the above Chemical Formula 3 and $R_{11}$ to $R_{20}$ each independently represents hydrogen, halogen, an alkyl group, an alkoxy group, an alkoxycarbonyl group, a cyano group, a nitro group, —U-Q-P or a substituent represented by the following Chemical Formula 4 and a pair of adjacent two substituents of $R_{11}$ to $R_{15}$ or a pair of adjacent two substituents of $R_{16}$ to $R_{20}$ may be linked to each other to form benzene substituted to —U-Q-P. Also, here, U represents —O—, —COO—, —OCO— or —OCOO—, and Q represents an alkylene group or an alkylidene group and P represents an alkenyl group, an epoxy group, a cyano group, a carboxyl group, an acryloyl group, a methacryloyl group, an acryloyloxy group or methacryloyloxy group.

[Chemical Formula 4]

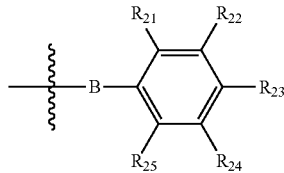

wherein B represents a single bond, —COO—, or —OCO— in the above Chemical Formula 4 and $R_{21}$ to $R_{25}$ each independently represents hydrogen, halogen, an alkyl group, an alkoxy group, a cyano group, a nitro group or —U-Q-P, and here, U represents —O—, —COO—, —OCO— or —OCOO—, and Q represents an alkylene group or an alkylidene group and P represents an alkenyl group, an epoxy group, a cyano group, a carboxyl group, an acryloyl group, a methacryloyl group, an acryloyloxy group, or methacryloyloxy group as a polymerized functional group.

A mark

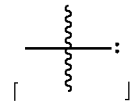

at the left of B in the above Chemical Formula 4 may mean that the B is directly linked to benzene represented by Chemical Formula 3.

The term 「single bond」 may mean that no special atom or atom group exists at a corresponding site. For example, the term 「single bond」 in the above Chemical Formulas 3 and 4 means a case in which no special atom exists at a site marked in A or B. For example, when A in Chemical Formula 3 is a single bond, benzenes at both sides of A may directly be linked to form a biphenyl structure.

Examples of the term "alkenyl group" may include, unless particularly indicated otherwise, an alkenyl group having 2 to 20 carbon atoms, 2 to 16 carbon atoms, 2 to 12 carbon atoms, 2 to 8 carbon atoms, 2 to 4 carbon atoms, 4 to 10 carbon atoms, or 6 to 9 carbon atoms. Such an alkenyl group may be a linear chain, branched-chain or ring-type. The alkenyl group may include, for example, a vinyl group, an allyl group, a prophenyl group, an isoprophenyl group, a butenyl group, a hexenyl group, a cyclohexenyl group or an octenyl group, and the like. Also, the alkenyl group may arbitrarily be substituted by at least one of substituent.

In the present specification, examples of the substituent capable of being substituted by arbitrarily compound or substituent may include halogen, a hydroxyl group, an alkyl group, an alkoxy group, an alkenyl group, an epoxy group, a cyano group, a carboxyl group, an isocyanate group, a mercapto group, an acryloyl group, a methacryloyl group, an acryloyloxy group, a methacryloyloxy group or an aryl group, and the like, but the present invention is not limited thereto.

The term "aryl group" may mean, unless particularly indicated otherwise, a compound having a benzene ring or a structure formed by a condensation of at least two benzene rings, or monovalent moiety derived from a derivative thereof. Also, the term "aryl group" may be a concept including a so-called aralkyl group, and the like. The aryl group may include, for example, an aryl group having 6 to 22 carbon atoms or 6 to 16 carbon atoms. Examples of the aryl group may include a phenyl group, a phenylethyl group, a phenylpropyl group, a benzyl group, a tolyl group, a xylyl group or a naphthyl group, and the like. The aryl group may arbitrarily be substituted by at least one of substituent.

As an example, in the above Chemical Formulas 3 and 4, P may each independently represent an acryloyl group, a methacryloyl group, an acryloyloxy group or a methacryloyloxy group. Also, as another example, in the above Chemical Formulas 3 and 4, P may each independently represent an acryloyloxy group or a methacryloyloxy group.

As an example, when a liquid crystal compound is a non-polymerized liquid crystal compound, the non-polymerized liquid crystal compound may be a compound, in which $R_{11}$ to $R_{20}$ each independently represents hydrogen, halogen, an alkyl group, an alkoxy group, an alkoxycarbonyl group, a cyano group, a nitro group in Chemical Formula 3 or a substituent represented by the following Chemical Formula 4. And, the non-polymerized liquid crystal compound may be a compound, in which $R_{21}$ to $R_{25}$ each independently represents hydrogen, halogen, an alkyl group, an alkoxy group, a cyano group or a nitro group in Chemical Formula 4.

As another example, when a liquid crystal compound is a polymerized liquid crystal compound, at least one of $R_{11}$ to $R_{20}$ may be —U-Q-P in the above Chemical Formula 3 or a substituent represented by the following Chemical Formula 4, and at least one pair of two adjacent substituents in the $R_{11}$ to $R_{15}$ or two adjacent substituents in the $R_{16}$ to $R_{20}$ may be linked to each other to form a benzene substituted by —U-Q-P. In such a case, —U-Q-P or a moiety represented by Chemical Formula 4, in which at least one of —U-Q-P or the moiety represented by Chemical Formula 4 may be present in the above Chemical Formulas 3 and 4, may be present, for example, at a site of $R_{13}$, $R_{18}$ or $R_{23}$, and for example, one or two —U-Q-P's or the moiety represented by Chemical Formula 4 may be present. In addition, besides —U-Q-P or the moiety represented by Chemical Formula 4 in the compound represented by the above Chemical Formula 3 or the moiety represented by Chemical Formula 4, a substituent may be, for example, hydrogen, halogen, a linear or branched alkyl group having 1 to 4 carbon atoms, a cycloalkyl group having 4 to 12 carbon atoms, a cyano group, an alkoxy group having 1 to 4 carbon atoms, or a nitro group. As another example, besides the —U-Q-P or the moiety represented by Chemical Formula 4, a substituent may be chlorine, a linear or branched alkyl group having 1 to 4 carbon atoms, a cycloalkyl group having 4 to 12 carbon atoms, an alkoxy group having 1 to 4 carbon atoms, or a cyano group.

A liquid crystal compound may be included in a proper content in comparison with a photo-alignment material including a halogen element so that a proper layer-separation may be induced and stable orientation is possible. The liquid crystal compound may be included, for example, in an amount of 30 to 300 parts by weight, 40 to 300 parts by weight, 50 to 300 parts by weight, 80 to 300 parts by weight, 90 to 300 parts by weight, 100 to 300 parts by weight, 150 to 300 parts by weight, 200 to 300 parts by weight, 30 to 250 parts by weight, 40 to 250 parts by weight, 80 to 250 parts by weight, 90 to 250 parts by weight, 100 to 250 parts by weight, or 200 to 250 parts by weight, relative to 100 parts by weight of a photo-alignment material including a halogen element.

In the above range, the liquid crystal compound may be stably aligned without a special alignment layer and may form a liquid crystal layer and an alignment layer that is layer-separated from the liquid crystal layer at the same time. Accordingly, the liquid crystal layer may be formed from the liquid crystal compound in a simplified process.

A liquid crystal composition may further include a proper initiator in view of usage purpose. As an example, when a liquid crystal layer including such a composition in a polymerized state as a liquid crystal composition is provided, a radical initiator or cation initiator capable of initiating a polymerization of the liquid crystal compound in the liquid crystal composition may be included in the liquid crystal composition. Also, as another example, even when the liquid crystal layer including the liquid crystal composition in a non-polymerized state is provided, a radical initiator or cation initiator capable of initiating an orientation reaction of a photo-alignment material in the liquid crystal composition may be included in the liquid crystal composition. However, in a case in which there is a potential for a liquid crystal compound to be polymerized by using a polymeric liquid crystal compound as a liquid crystal compound, and the like, an initiator may not be used.

The radical initiator may use a free radical initiator that is well known in the prior art. The free radical photoinitiator include, for example, amino ketones, such as 2-methyl-1-[4-(methylthio)phenyl]-2-(4-morpholinyl)-1-propanone and 2-benzyl-2-(dimethylamino)-1-[4-(4-morpholinyl)phenyl]-1-butanone; benzoin ethers, such as benzoin methyl ether and benzoin isopropyl ether; substituted benzoin ethers, such as anisoin methyl ether; substituted acetophenones, such as 2,2-diethoxyacetophenone and 2,2-dimethoxy-2-phenylacetophenone; substituted alpha-ketols, such as 2-methyl-2-hydroxypropyophenone; aromatic phosphine oxides, such as bis(2,4,6-trimethylbenzoyl)phenyl phosphine oxide; aromatic sulfonyl chlorides, such as 2-naphthalene-sulfonyl chloride; photoactive oximes, such as 1-phenyl-1,2-propanedione-2-(O-ethoxycarbonyl)oxime; and the like; and a mixture thereof, but the present invention is not limited thereto.

A useful thermal free radical initiator includes, for example, azo compounds, such as 2,2'-azo-bis(isobutyronitrile), dimethyl 2,2'-azo-bis(isobytyrate), azo-bis(diphenyl methane), and 4,4'-azo-bis(4-cyanopentanoic acid); peroxides, such as peroxide, benzoyl peroxide, cumyl peroxide, tert-butyl peroxide, cyclohexanone peroxide, glutartic acid peroxide, lauroyl peroxide, and methyl ethyl ketone peroxide; hydroperoxides, such as tert-butyl hydroperoxdie and cumene hydroperoxide; peroxy acids, such as peracetic acid, perbenzoic acid, persulphuric acid kalium, and persulphuric acid ammonium; peresters, such as diisopropyl and percarbonate; thermal redox inititator; and the like; and a mixture thereof, but the present invention is not limited thereto.

As an example, a free radical initiator may include a free radical photoinitiator in view of availability of general use and simultaneous initiation, solventless treatment possibility, storage stability, and the like. For this reason, the free radical photoinitiator may include, for example, a free radical photoinitiator selected from amino ketone, substituted acetophenone, aromatic phosphine oxide, and a mixture thereof.

The cation initiator may use an initiator that is known in the prior art. A useful cation photoinitiator includes any various known useful materials, for example, onium salt, a special organic metal complex, and the like, and a mixture thereof. A useful onium salt includes one having a structure formula, AX, and here, A is an organic cation (for example, may be selected from diazonium, iodonium, and sulfonium cation and specifically, may be selected from diphenyliodonium, triphenylsulfonium, and phenylthiophenyl diphenylsulfonium), and X is an anion (for example, organic sulfonate, halogenated metal, or metalloid). Especially, a useful onium salt includes aryl diazonium salt, diaryliodonium salt, and triaryl sulfonium salt, but the present invention is not limited thereto. A useful cation thermal initiator includes quaternary ammonium salts of imidazole and superacid (for example, quaternary ammonium salt of $SbF_6$), and the like, and a mixture thereof. As an example, a cation initiator may include a cation photoinitiator in view of availability of general use and simultaneous initiation, solventless treatment possibility, and storage stability. Among these, for this reason, it is possible to use a cation photoinitiator selected from anium salts and a mixture thereof.

A specific ratio of a radical initiator or cation initiator may properly be selected, but the present invention is not specifically limited, according to purposes. For example, such an initiator may be included in a ratio of 0.01 parts by weight to 20 parts by weight, relative to 100 parts by weight of a liquid crystal compound, but the present invention is not limited thereto. When the ratio of initiator is extremely low, a proper polymerization may not be induced; on the contrary, when it is extremely high, physical properties may be deteriorated due to a residual initiator after forming an alignment layer. Therefore, a proper ratio may be selected considering the above things.

Such a liquid crystal composition may be uniformly mixed and prepared in a proper solvent if necessary for a coating ability of the composition. As an example, when a specific solvent is used as a solvent capable of being added in a liquid crystal composition, the specific solvent may control such that a phase-separation easily occurs during application of the liquid crystal composition. Examples of the solvent may include one or two or more of an ether solvent, an aromatic solvent, a halogen solvent, an olefin solvent, a ketone solvent, and the like. Examples of the solvent may include cyclopentanone, cyclohexanone, chlorobenzene, N-methylpyrrolidone, toluene, xylene, mesitylene, cymene, dimethylsulfoxide, dimethylformamide, chloroform, gamma butyrolactone, tetrahydrofuran, and the like.

The liquid crystal composition may further include properly any additive that is known in the prior art, if necessary, in addition to the aforementioned components. Example of any additive may include a chiral agent, surfactant, polymerized monomer, polymer, and the like.

Another embodiment of the present application provides a liquid crystal film. Such a liquid crystal film may include a substrate layer; and a liquid crystal layer formed on the substrate layer, in which a liquid crystal compound is present in an aligned state in the liquid crystal layer.

The substrate layer may be used without limitation as long as it is used in the art. Especially, the substrate layer may be a substrate layer without orientation. However, the present invention is not limited thereto, but it is possible to use a substrate having orientation as a substrate layer. The term "orientation" may mean property capable of orienting adjacent liquid crystal molecules, liquid crystal compounds, or precursors thereof in a predetermined direction.

As the substrate layer, various types of substrates may be used. As an example, the substrate layer may include an optically isotropy substrate, an optically anisotropic substrate, such as a retardation layer exhibiting retardation property, a polarizer element, and the like.

An optically isotropy substrate may include a transparent substrate, such as a glass or transparent plastic substrate. Examples of the plastic substrate may include: cellulose substrates, such as diacetyl cellulose (DAC) or triacetyl cellulose (TAC) substrate; cyclo olefin copolymer (COP) substrates, such as a norbornene derivative resin substrate; acrylic substrates, such as a poly(methyl methacrylate) (PMMA) substrate; polycarbonate (PC) substrates; olefin substrates, such as a polyethylene (PE) or polypropylene (PP) substrate; polyvinyl alcohol (PVA) substrates; poly ether sulfone (PES) substrates; polyetheretherketone (PEEK) substrates; polyetherimide (PEI) substrates; polyethylenenaphthalate (PEN) substrates; polyester substrates, such as a polyethyleneterephthalate (PET) substrate; polyimide (PI) substrates; polysulfone (PSF) substrates; polyarylate (PAR) substrates; fluorine resin substrates; and the like. The substrates may have, for example, a sheet or film shape.

An optically anisotropic substrate, for example, a retardation layer, may include, for example, a ¼ wavelength layer, a ½ wavelength layer, and the like. The term "n wavelength layer" may mean a retardation element capable of performing a retardation of light incident to the wavelength layer to such an extent as to be n-times of wavelength thereof. The retardation layer may be a liquid crystal polymer layer formed by orienting and polymerizing a polymerized liquid crystal compound, or a plastic film or sheet having birefringence given by an elongation process, a contraction process, and the like.

A polarized element may use a general element that is known in the prior art. For example, the polarized element may use an element prepared by absorbing and orienting a dichroic dye, and the like to a polyvinyl alcohol resin.

For the substrate, various surface treatments, such as a low reflection treatment, an anti-reflection treatment, an anti-glare treatment, and/or a high resolution anti-glare treatment may be performed, if necessary.

As an example, a liquid crystal layer may be formed by the aforementioned liquid crystal composition. The liquid crystal layer may include an aligned liquid crystal compound. The liquid crystal compound may be aligned, for example, in a homogeneous, homeotropic, tilted, splay, or cholesteric type.

The liquid crystal layer formed of the liquid crystal composition may be included in a state of being phase-separated from the liquid crystal compound in a state of orientationally ordering a photo-alignment material in the liquid crystal layer. In other words, the liquid crystal layer may include a layer that is phase-separated from the liquid crystal compound in a state of orientationally ordering a photo-alignment material, and a layer composed of the liquid crystal compound aligned by a layer formed by the photo-alignment material. The present specification, the layer formed by the photo-alignment material is called an alignment layer. And, the liquid crystal layer may mean only a layer formed by a phase-separated liquid crystal compound in a narrow sense, but the liquid crystal layer may mean a layer including an alignment layer and layer formed by the liquid crystal compound in a broad sense.

As described above, the liquid crystal composition may form a liquid crystal layer and an alignment layer, thereby, the liquid crystal composition may form a liquid crystal layer including an aligned liquid crystal compound even though a liquid crystal layer is formed without forming a special alignment layer on a substrate layer without orientation. In other words, for the liquid crystal film, the substrate layer may be a substrate layer without orientation, and the liquid crystal layer may be a liquid crystal layer that is formed adjacent to the substrate layer.

For the liquid crystal layer, the liquid crystal compound may be included in the liquid crystal layer in a non-polymerized state or polymerized state.

As an example, when a liquid crystal compound is included in a liquid crystal layer in a non-polymerized state, an aligned state of the liquid crystal compound may be switched by supply of voltage. The present specification, the term "liquid crystal film" may be used as a meaning including a liquid crystal layer composed of non-polymerized liquid crystal compound and polymerized liquid crystal compound, but especially, a liquid crystal film including a liquid crystal layer composed of a non-polymerized liquid crystal compound may separately be called a liquid crystal cell.

As another example, a liquid crystal layer may include an aligned liquid crystal molecule. In the present specification, the term 「liquid crystal molecule」 may mean a liquid crystal polymer formed by polymerizing a polymerized liquid crystal compound in an aligned state. The aligned state of the liquid crystal layer including the liquid crystal molecule may not be changed by supply of voltage.

Another embodiment of the present application provides a method of preparing a liquid crystal film. The method of preparing the liquid crystal film may include forming a liquid crystal layer by irradiating polarized light onto a coating layer including a liquid crystal composition, which is formed on a substrate layer. As an example, the method of preparing the liquid crystal film may be a method of preparing the liquid crystal film as aforementioned above.

The preparing method may further include forming a coating layer by applying a liquid crystal composition on a substrate layer. Here, the liquid crystal composition may use the aforementioned liquid crystal composition. As an example, when a liquid crystal layer of a non-polymerized liquid crystal composition is formed, a liquid crystal composition including no initiator or a very small quantity of an initiator may be used. As another example, when a liquid crystal layer of a polymerized liquid crystal compound is formed, a liquid crystal composition including an initiator may be used. The initiator may be used as described above.

A method of applying the liquid crystal composition on a substrate layer may use a general method, for example, a bar coating, a comma coating or a spin coating, and the like. The composition may be applied, for example, in a thickness of about 0.01 μm to about 10 μm or about 0.1 μm to about 5 μm.

Subsequently, a coating layer including a liquid crystal composition may be dried in proper condition. As an example, the drying condition may be performed by maintaining the coating layer at a temperature of about 25° C. to 150° C. for about 30 seconds or more. When a drying temperature is 25° C. or higher, the remaining solvent, and the like in the coating layer are sufficiently dried, and thereby spots, and the like, may be prevented. Also, when a drying temperature is 150° C. or less, modification of the substrate layer may be prevented.

After drying the coating layer, irradiation of light, for example, linearly polarized ultraviolet may be irradiated. Accordingly, a photo-alignment material present on the coating layer may be phase-separated from the liquid crystal compound to form an alignment layer.

The irradiation of linearly polarized ultraviolet may be performed, for example, by using a wire grid polarizer, and the like. In such a process, it is possible to control an alignment direction of an alignment layer by controlling a polarization direction of ultraviolet. Also, such light may be irradiated for at least 0.5 seconds, for example.

By such irradiation of light, a photo-alignment material including a halogen element included in a dried composition may be orientated by, for example, a photo-crosslinking or photo-polymerization reaction. Also, the photo-alignment material including a halogen element may be moved, for example, toward a light irradiation direction in the coating layer, thereby being layer-separated from a liquid crystal compound. Therefore, the light irradiation direction may be controlled in view of the position to form an alignment layer from a photo-alignment material. As an example, as illustrated in FIG. 1, when light is irradiated onto the side opposite to the side having a substrate layer (101) among one side of a coating layer (12), a liquid crystal film having a liquid crystal layer (102) between an alignment layer (103) and the substrate layer (101) may be formed.

Also, in a light irradiation process, a liquid crystal compound may be layer-separated from a liquid crystal compound, and may be aligned by an alignment layer aligned according to a polarization direction of polarized ultraviolet.

As an example, in order to increase orientation of a liquid crystal layer after an alignment treatment, at least one drying process may be performed again. A coating membrane of a liquid crystal composition may be alignment-treated to form an alignment layer and liquid crystal layer, which are layer-separated, and subsequently, the layer-separated alignment layer and liquid crystal layer may be dried to induce a non-aligned liquid crystal compound, which is likely to be remained in the liquid crystal layer, to be aligned.

In such a process, when a liquid crystal composition including the aforementioned initiator is used as a liquid crystal composition, a liquid crystal compound of the liquid crystal layer may be polymerized in a step of irradiating polarized ultraviolet. However, the present invention is not limited thereto, and a special polymerization process may further be performed, if necessary, in order to polymerize the liquid crystal compound of the liquid crystal layer. As an example, after a step of irradiating polarized light onto the coating layer, subsequently, a liquid crystal compound of the liquid crystal layer may be polymerized by irradiating light, for example, non-polarized ultraviolet on the liquid crystal layer. Such a polymerization may be performed under the presence of a cation initiator or radical initiator absorbing a wavelength of ultraviolet region.

Ultraviolet irradiation may be performed in the atmosphere, or under the nitrogen atmosphere blocking oxygen in order to increase reaction efficiency. In general, the ultraviolet irradiation may be performed by using a medium pressure or high pressure mercury UV lamp or a metal halide lamp having strength of 80 mW/cm$^2$ or higher as an ultraviolet irradiator. If necessary, a cold mirror or other cooling devices may be installed between an ultraviolet lamp and a substrate layer so that a temperature of a liquid crystal layer is in the range, in which the liquid crystal layer is in a liquid crystal state during the ultraviolet irradiation.

The method of preparing the liquid crystal film may further include a process that is generally performed in the prior art, except that an alignment layer and a liquid crystal layer are formed of one type of a liquid crystal composition by using one process.

It is possible to apply the liquid crystal film to various technical fields. For example, it is possible to apply the liquid crystal film to a display device, and the like. The liquid crystal film may be useful, for example, as an optical compensation substrate for a display device or a liquid crystal panel, such as a display device. Accordingly, the liquid crystal film may be included in such a device as a liquid crystal panel or an optical compensation substrate.

When the liquid crystal film is included in such a device as an optical compensation substrate, the film may include, for example, a retardation film, such as a super twist nematic (STN) LCD, a thin film transistor-twisted nematic (TFT-TN) LCD, a vertical alignment (VA) LCD, or an In-plane switching (IPS) LCD, and the like; a λ/2 wavelength plate; λ/4 wavelength plate; a reverse wave dispersion property film; an optical compensation film; a color film; a laminated film with a polarizing plate or a polarizer; a polarizing plate compensation film, and the like.

A method of constituting a display device by using such a film according to use of the liquid crystal film is not specifically limited. There are various known methods of constituting a place or a device, in which the film is located inside the device according to use of the liquid crystal film in the field, and all of the methods may be applied.

As a display device including the liquid crystal film, a liquid crystal display device will be illustrated as follows.

A liquid crystal display device includes a liquid crystal panel, and a first and second polarizing plate that are disposed on both sides of the liquid crystal panel, respectively. The liquid crystal film may be disposed between the liquid crystal panel and the first polarizing plate and/or the liquid crystal panel and the second polarizing plate.

Here, a protecting film may be included on one side or both sides of the first and/or second polarizing plate. The protecting film may include a TAC film, a polynorbornene film prepared by a ring opening metathesis polymerization (ROMP), a ring opening metathesis polymerization followed by hydrogenation (HROMP) polymer prepared by again hydrogenating ring opening polymerized cycloolefin polymer (COP), a polyester film, or a polynorbornene-based film prepared by an addition polymerization, and the like. Besides, a film prepared by a transparent polymer material may be used as a protecting film, but the present invention is not limited thereto.

Advantageous Effects

As an exemplary liquid crystal composition of the present application can provide a liquid crystal layer aligned without a separate alignment layer. According to the liquid crystal composition, all of the liquid crystal cell, in which the liquid crystal layer is maintained in a non-polymerized state, and the liquid crystal film prepared by polymerizing the liquid crystal layer can be provided.

BEST MODES OF THE INVENTION

Hereinafter, the liquid crystal composition will be described in further detail with reference to the following Examples and Comparative Examples, but the range of the composition is not limited to the following Examples.

Hereinafter, physical properties for Examples and Comparative Examples were evaluated by using the following methods.

1. Evaluation of Liquid Crystal Orientation

Figure 1:
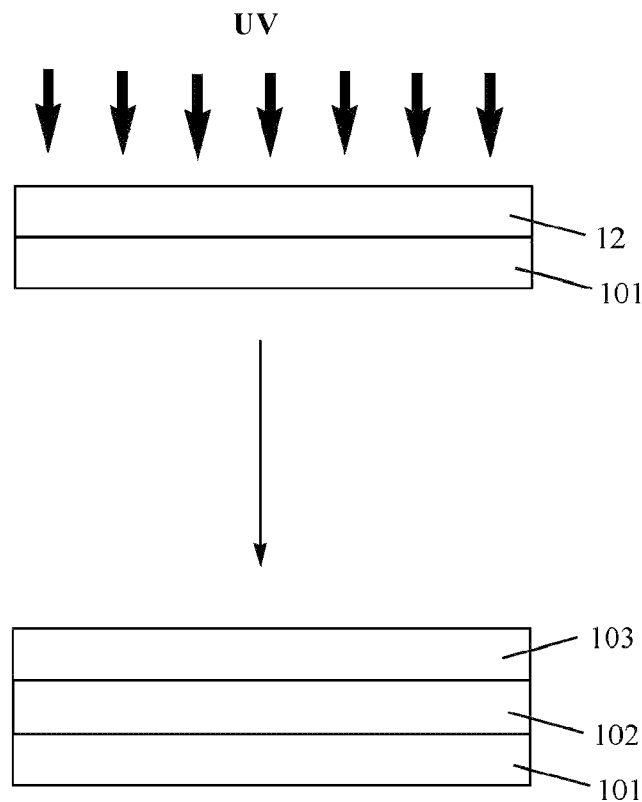
FIG. 1 is a schematic diagram illustrating parts of a method of preparing an exemplary liquid crystal film.
Figure 2:
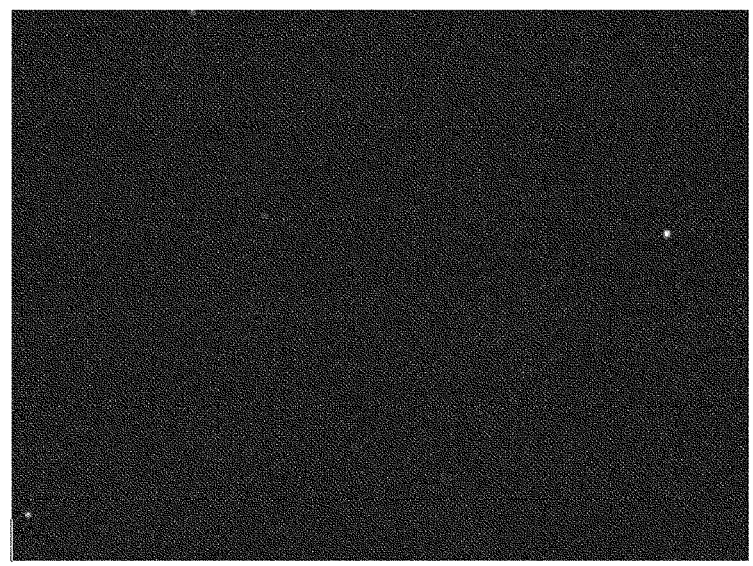
FIGS. 2 to 4 are polarizing microscope images illustrating the liquid crystal films prepared in Examples 1, 2, and Comparative Example 1, respectively.
Figure 3:
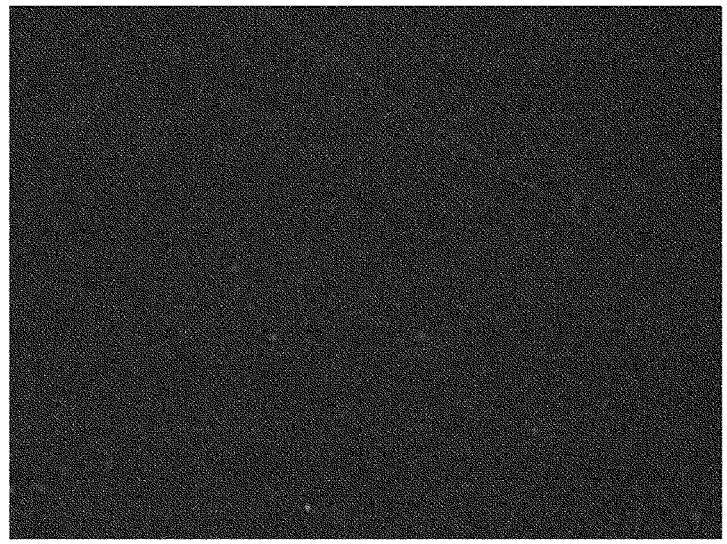
Figure 4:
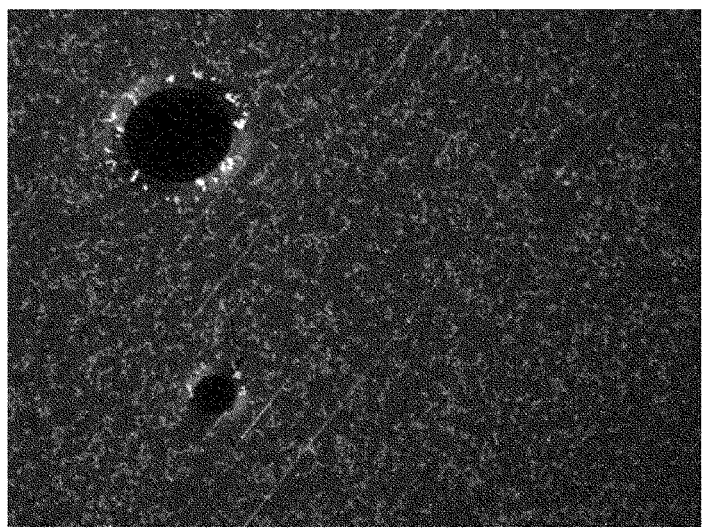

In a state where penetration axes of two polarizing plates of a polarizing microscope are perpendicular to each other, a liquid crystal cell or a liquid crystal film prepared in Examples or Comparative Examples was disposed between two polarizing plates. At this time, the liquid crystal cell or the liquid crystal film was disposed such that an optical axis corresponded with the penetration axis of any one polarizing plate among the above polarizing plates. In such a disposition state, when retardation did not occur on the liquid crystal cell or liquid crystal film, thereby uniformly orienting the liquid crystal of the liquid crystal cell or liquid crystal film, there was no shine phenomenon between the polarizing plates, which were observed to be black. Therefore, a degree of shine was evaluated by using CA210, a device measuring luminance between the perpendicular polarizing plates in such a state, and liquid crystal orientation of the liquid crystal cell or liquid crystal film was evaluated on the basis of the degree of shine. The images of polarizing microscopes of the liquid crystal cells and liquid crystal film in Examples and Comparative Examples are illustrated in FIGS. 2 to 4.

<Evaluation Criteria>

O: a case of not observing shine

X: a case of observing shine

2. Evaluation of Liquid Crystal Fluidity

After applying pressure in the pressure degree of fingers on the liquid crystal cells or liquid crystal films prepared in Examples or Comparative Examples, it was confirmed whether the liquid crystal cells or liquid crystal films were again maintained in an initial aligned state. When the aligned states of the liquid crystal cells or liquid crystal films were returned to an initial aligned state within about 5 seconds, it was designated that there was liquid crystal fluidity.

<Evaluation Criteria>

O: a case of returning liquid crystal orientation of the liquid crystal cell or liquid crystal film to an initial aligned state within about 5 seconds after applying pressure.

X: a case of not returning liquid crystal orientation of the liquid crystal cell or liquid crystal film to an initial aligned state within about 5 seconds after applying pressure.

3. Layer-separation Evaluation

Figure 6:
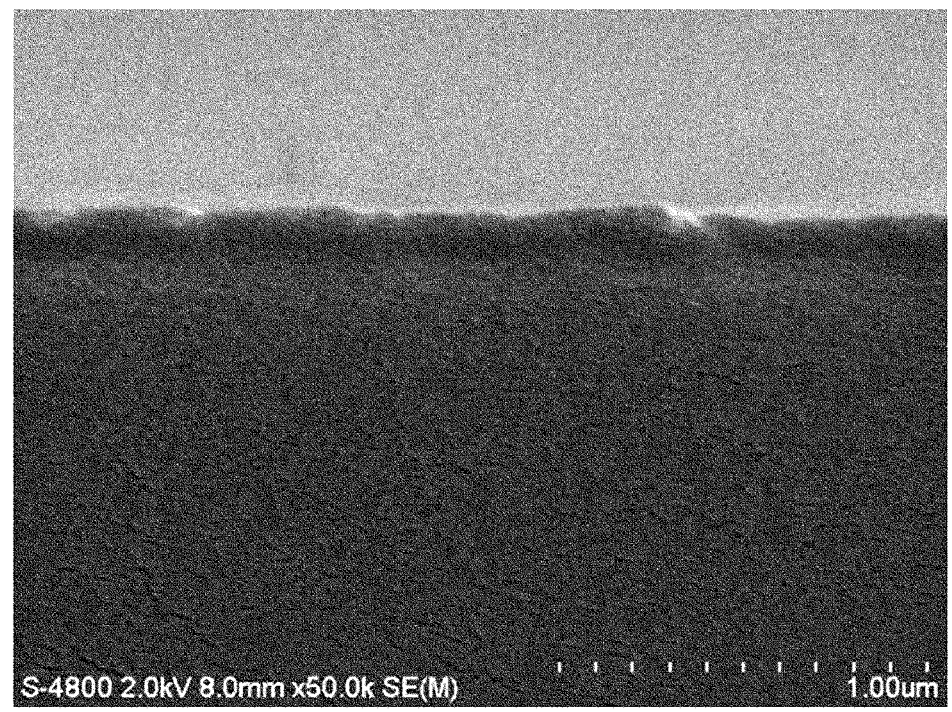
FIGS. 6 to 8 are SEM images illustrating the cross sections of the liquid crystal films prepared in Examples 1, 2, and Comparative Example 2, respectively.
Figure 7:
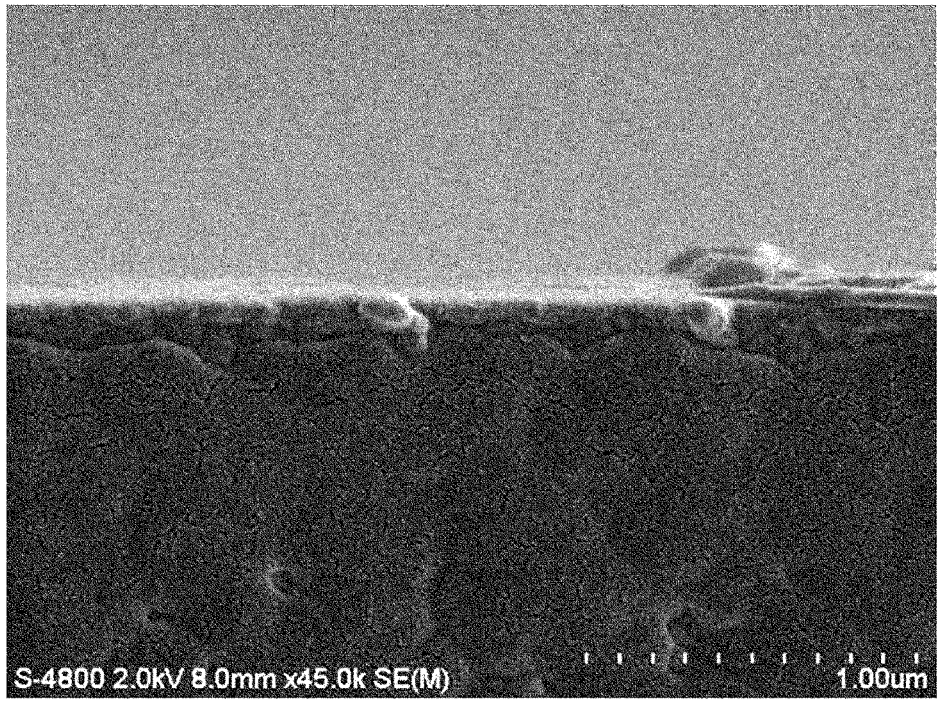
Figure 8:
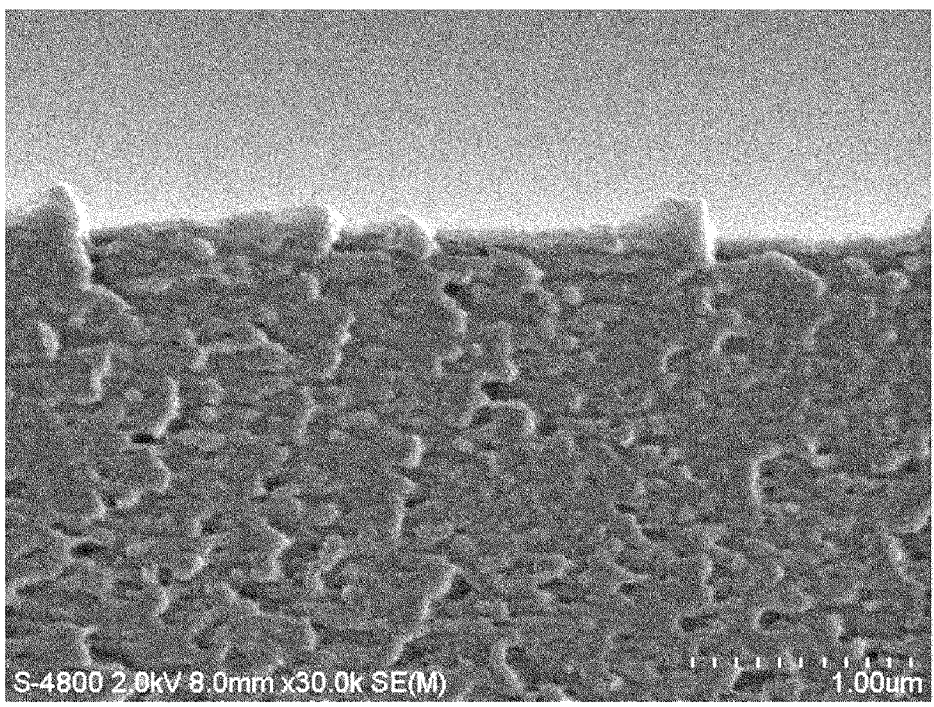

By confirming scanning electron microscope (SEM) images of cross section of a liquid crystal cell or liquid crystal film prepared in Examples or Comparative Examples, it was evaluated whether layer-separation in the liquid crystal cell or liquid crystal film occurred. The SEM images of Examples 1, 2, and Comparative Example 1 are illustrated in FIGS. 6 to 8, respectively.

Example 1

(1) Preparation of Liquid Crystal Composition

A photo-alignment material including a repeating unit represented by the following Chemical Formula B was mixed to a liquid crystal compound represented by the following Chemical Formula A (Trade name: LC242, Manufacturer: BASF) in a ratio of 30 parts by weight, relative to 70 parts by weight of the liquid crystal compound. Then, the mixture was again dissolved in toluene to be a solid concentration of 30% by weight to prepare a liquid crystal composition.

cal Formula A (Trade name: LC242, Manufacturer: BASF) in a ratio of 30 parts by weight, relative to 70 parts by weight of the liquid crystal compound. Then, the mixture was again dissolved in cyclopentanone to be a solid concentration of 30% by weight. Then, a radical photoinitiator (Trade Name: IRGACURE 907, Manufacturer: Ciba-Geigy) was added in a rate of 0.5 parts by weight, relative to 100 parts by weight of the solid content to prepare a liquid crystal composition.

(2) Preparation of Liquid Crystal Film

The liquid crystal composition prepared in Example 2 was coated on one side of a COP substrate layer (Refractive Index: 1.53, Thickness: 100,000 nm) to be a thickness of about 2 μm after drying, and then heated in an oven at 60° C. for 2 minutes to remove the solvent inside the coating membrane. Subse-

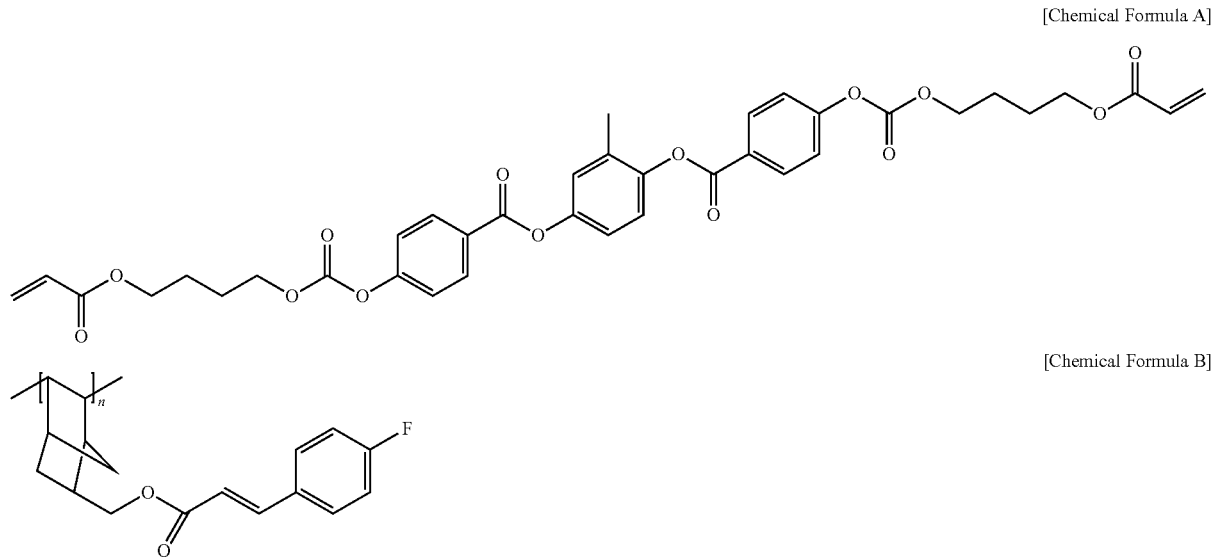

[Chemical Formula A]

[Chemical Formula B]

(2) Preparation of Liquid Crystal Cell

The liquid crystal composition was coated on one side of a TAC substrate layer (Refractive Index: 1.49, Thickness: 80,000 nm) to be a thickness of about 2 μm after drying, and then heated in an oven at 60° C. for 2 minutes to remove the solvent inside the coating membrane. Subsequently, a wire grid polarizing plate (manufactured by Moxtek) capable of generating linearly polarized light in a predetermined direction was located on top of the dried coating membrane. Then, while the TAC substrate layer was moved in a rate of about 3 m/min, ultraviolet (Light Source: using a high pressure mercury lamp having strength of 200 mW/cm$^2$) was irradiated onto the dried coating membrane to perform an alignment treatment. Subsequently, in order to increase orientation of the liquid crystal layer, the liquid crystal layer was dried in an oven at 100° C. for about 2 minutes to prepare a liquid crystal cell.

Example 2

(1) Preparation of Liquid Crystal Composition

A photo-alignment material including the repeating unit represented by the above Chemical Formula B was mixed to the liquid crystal compound represented by the above Chemiquently, a wire grid polarizing plate (manufactured by Moxtek) capable of generating linearly polarized light in a predetermined direction was located on the top of the dried coating membrane. Then, while the TAC substrate layer was moved in a rate of about 3 m/min, ultraviolet (Light Source: using a high pressure mercury lamp having strength of 200 mW/cm$^2$) was irradiated onto the dried coating membrane to perform an alignment treatment. Subsequently, in order to increase orientation of the liquid crystal layer, the liquid crystal layer was dried in an oven at 100° C. for about 2 minutes to prepare a liquid crystal film.

Figure 5:
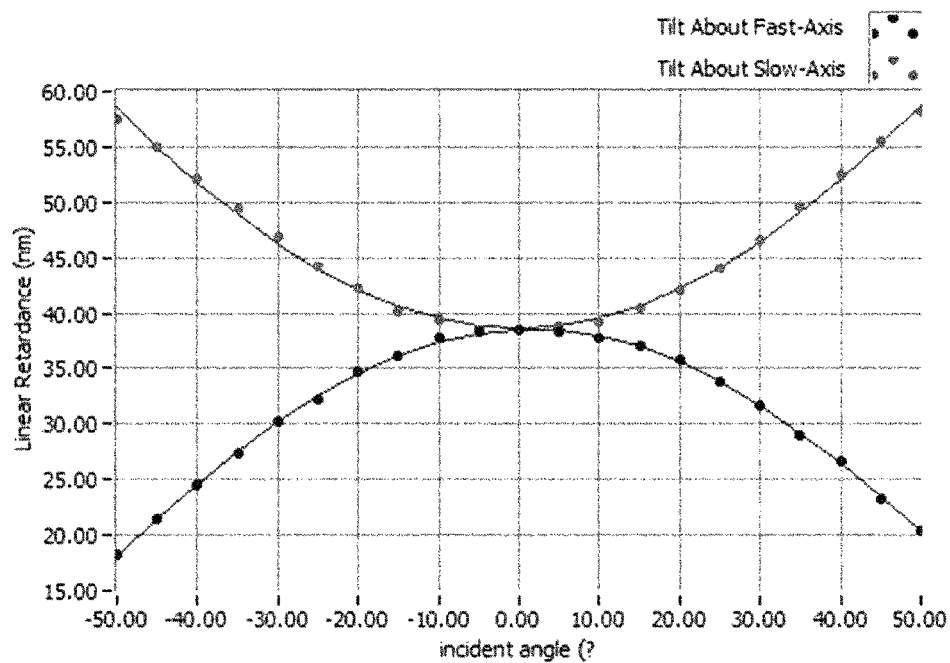
FIG. 5 is a diagram illustrating a retardance (vertical axis) according to an incident angle (horizontal axis) of the liquid crystal film prepared in Example 2.

A retardance of the liquid crystal film at an incident angle of −50.00° to +50.00° was measured by using Axoscan, a device of measuring a retardance manufactured by Axomatrix. The results are illustrated in FIG. 5.

Comparative Example 1

A liquid crystal composition and liquid crystal film were prepared by using the same method as Example 2, except that a photo-alignment material including a repeating unit represented by the following Chemical Formula C was used as a photo-alignment material.

[Chemical Formula C]

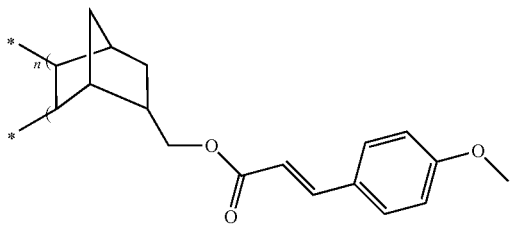

TABLE 1

|  | Liquid Crystal Orientation | Liquid Crystal Fluidity |
| --- | --- | --- |
| Example 1 | ○ | ○ |
| Example 2 | ○ | X |
| Comparative Example 1 | X | X |

As described above, it can be observed as illustrated in FIGS. 2 and 3 that the liquid crystal cells and liquid crystal films prepared in Examples 1 and 2 have excellent liquid crystal orientation. In addition, it can also be observed that the liquid crystal cell prepared in Example 1 has liquid crystal fluidity so that the aligned state can be switched by supply of voltage. It can be confirmed as illustrated in FIG. 5 that the liquid crystal film prepared in Example 2 exhibits a uniform retardance symmetrical to an incident angle of −50.00° to +50.00° and thereby is uniformly aligned in one direction. However, in the case of Comparative Example 1, it can be confirmed as illustrated in FIG. 4 that the liquid crystal film exhibits poor liquid crystal orientation. In addition, it can be confirmed as illustrated in FIGS. 6 and 7 that there are phase-separation phenomena in the cases of Examples 1 and 2. However, it can be confirmed as illustrated in FIG. 8 that there is no phase-separation phenomenon in the case of Comparative Example 1.

The invention claimed is:

1. A liquid crystal composition, comprising:
a photo-alignment material comprising a halogen element, that comprises a unit represented by Chemical Formula 1; and
a liquid crystal compound:

[Chemical Formula 1]

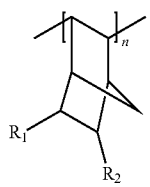

wherein n represents a number of 50 to 5,000 in the above Chemical Formula 1 and $R_1$ and $R_2$ each independently represents hydrogen, halogen, an alkyl group, or a moiety represented by the following Chemical Formula 2, wherein at least one of the $R_1$ and $R_2$ represents a moiety represented by the following Chemical Formula 2,

[Chemical Formula 2]

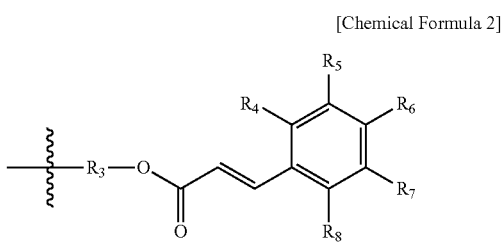

wherein $R_3$ represents an alkylene group or an alkylidene group in the above Chemical Formula 2 and $R_4$ to $R_8$ each independently represents hydrogen, halogen, an alkyl group, an alkoxy group, or an allyloxy group; and at least one of the unit represented by the above Chemical Formula 1 and the moiety represented by the above Chemical Formula 2 includes a halogen element as a substituent.

2. The liquid crystal composition of claim 1, wherein the liquid crystal compound is comprised in an amounts of 30 parts by weight to 300 parts by weight, relative to 100 parts by weight of the photo-alignment material including the halogen element.

3. The liquid crystal composition of claim 1, wherein the liquid crystal compound is a polymerized liquid crystal compound or a non-polymerized liquid crystal compound.

4. The liquid crystal composition of claim 1, further comprising a solvent.

5. The liquid crystal composition of claim 4, wherein the solvent is cyclopentanone, cyclohexanone, chlorobenzene, N-methylpyrrolidone, toluene, xylene, mesitylene, cymene, dimethylsulfoxide, dimethylformamide, chloroform, gamma butyrolactone, or tetrahydrofuran.

6. A liquid crystal film, comprising:
a substrate layer; and
a liquid crystal layer formed by the liquid crystal composition of claim 1 formed on the substrate layer, wherein the liquid crystal compound is present in an aligned state in the liquid crystal layer.

7. The liquid crystal film of claim 6, wherein the substrate layer is a substrate layer without orientation and the liquid crystal layer is formed adjacent to the substrate layer.

8. The liquid crystal film of claim 6, wherein the aligned state of the liquid crystal compound is switched by supply of a voltage.

9. The liquid crystal film of claim 6, wherein the liquid crystal compound is polymerized in the aligned state to form a liquid crystal polymer.

10. The liquid crystal film of claim 6, wherein the photo-alignment material is phase-separated from the liquid crystal compound in an orientationally ordered state in the liquid crystal layer.

11. A method of preparing a liquid crystal film, comprising irradiating polarized light onto a coating layer including the liquid crystal composition of claim 1 formed on a substrate layer to form a liquid crystal layer.

\* \* \* \* \*